United States Patent [19]

Yamaguchi et al.

[11] Patent Number: 5,036,176
[45] Date of Patent: Jul. 30, 1991

[54] PLASMA ARC CUTTER AND METHOD OF CONTROLLING THE SAME

[75] Inventors: Yoshihiro Yamaguchi, Hiratsuka; Iwao Kuorkawa, Yokohama, both of Japan

[73] Assignee: Kabushiki Kaisha Komatsu Seisakusho, Tokyo, Japan

[21] Appl. No.: 427,106

[22] PCT Filed: Mar. 23, 1989

[86] PCT No.: PCT/JP89/00305
§ 371 Date: Oct. 18, 1989
§ 102(e) Date: Oct. 18, 1989

[87] PCT Pub. No.: WO89/09110
PCT Pub. Date: Oct. 5, 1989

[30] Foreign Application Priority Data

Mar. 24, 1988 [JP] Japan ................. 63-70079
May 24, 1988 [JP] Japan ................. 63-127387

[51] Int. Cl.⁵ .............................................. B23K 9/00
[52] U.S. Cl. ................... 219/121.44; 219/121.54; 219/121.55; 219/121.59
[58] Field of Search .............. 219/121.54, 121.57, 219/121.56, 121.55, 130.1, 130.21, 130.4, 121.59, 121.39, 121.44

[56] References Cited

U.S. PATENT DOCUMENTS 4,017,707 4/1977 Brown et al. ................. 219/121 P
4,839,499 6/1989 Kotecki et al. ............... 219/121.57

FOREIGN PATENT DOCUMENTS

43-27950 12/1968 Japan .
51-20020 6/1976 Japan .
51-78765 7/1976 Japan .
51-143547 12/1976 Japan .
52-44584 10/1977 Japan .
57-34700 1/1982 Japan .
60-6750 2/1985 Japan .
63-20166 1/1988 Japan .
63-36974 2/1988 Japan .
0268572 11/1988 Japan ...................... 219/121.54

Primary Examiner—M. H. Paschall
Attorney, Agent, or Firm—Richards, Medlock & Andrews

[57] ABSTRACT

In a plasma arc cutter and a method of controlling the same, a rise compensating circuit (39) and a shift compensating circuit (44) both composed of a charging and discharging capacitor and a resistor are respectively inserted in parallel between an electrode-side connection (21) and a nozzle-side connection (35) and between the electrode-side connection (21) and a workpiece-side connection (34), and a diode (33) is provided on the workpiece-side connection in such a manner as to be inserted between a connecting point (36) of the nozzle-side connection and a connecting point (43) of the shift compensating circuit. A detector (31) for controlling a current is provided on the electrode-side connection at a position closer to the electrode side than a connecting point (37) of the rise compensating circuit, and a detector (32) for detecting a shift is provided on the workpiece-side connection at a position closer to the workpiece side than the connecting point (43) of the shift compensating circuit. In addition, to effect cutting after boring, at least one plasma torch (14a) for boring and at least one plasma torch (14b) for cutting are provided. Furthermore, the voltage between an electrode (14) and a workpiece (17) or between a nozzle (15) and the workpiece (17) is detected, and the power source is stopped when that voltage exceeds a predetermined value. Consequently, since a shift from a pilot arc to a main arc is facilitated, cutting is performed by the exclusive plasma torch, and the occurrence of a double arc is prevented, cutting precision and cutting efficiency are enhanced.

17 Claims, 8 Drawing Sheets

PLASMA ARC CUTTER AND METHOD OF CONTROLLING THE SAME

DESCRIPTION

1. Technical Field

The present invention relates to a plasma arc cutter for cutting workpieces with high precision and high efficiency and a method of controlling the same.

2. Background Art

Figure 1:
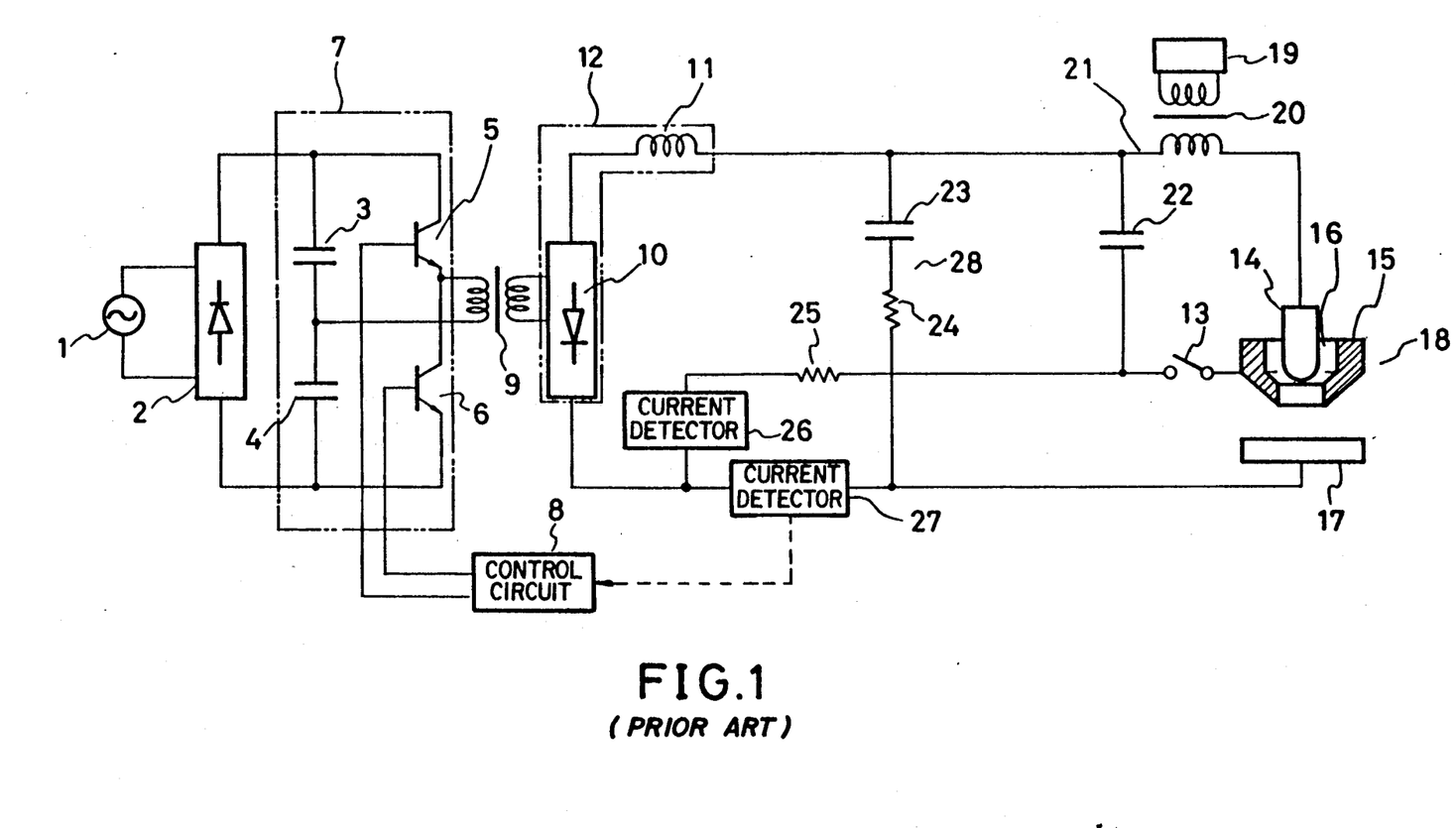
FIG. 1 is a circuit diagram of a power source for a plasma arc cutter in accordance with the conventional art.

A conventional plasma arc cutter used in cutting metals has a configuration such as the one shown in FIG. 1. A commercial alternating current 1 is converted into a direct current by a rectifying circuit 2 composed of a diode. The DC output from this rectifying circuit 2 is converted into an alternating current having a predetermined frequency as transistors 5, 6 are alternately switched by base currents alternately output from a control circuit 8 to the bases of the transistors 5, 6 of an inverter circuit 7 composed of capacitors 3, 4 and the transistors 5, 6. Furthermore, an AC output of the inverter circuit 7 is transformed by a transformer 9 and is then converted into a DC output capable of stably maintaining an arc discharge by means of a serial circuit 12 composed of a rectifying circuit 10 and a smoothing reactor 11.

Upon starting of an arc discharge, a contact 13 is closed, and an operating gas is supplied to a gas passage 16 between an electrode 14 and a nozzle 15 of a plasma torch 18. When the operating gas flows, the inverter circuit 7 is actuated, and a voltage which sets the electrode 14 to minus and the nozzle 15 and the workpiece 17 to plus is applied to the plasma torch 18. At this stage, however, although a voltage (no-load voltage) is produced between the electrode 14 and the nozzle 15, dielectric breakdown has not occurred and there is no current flow. Then, a high-frequency generating circuit 19 is operated, and a high-frequency high voltage is generated at both ends of the secondary coil (electrode-side connection 21) of a coupling coil 20. This high-frequency high voltage is applied by a bypass capacitor 22 between the electrode 14 and the nozzle 15 in such a manner as to be superposed on the aforementioned no-load voltage. Thus, dielectric breakdown occurs due to a high-frequency discharge, followed by the generation of a pilot arc and then an arc discharge.

At this time, the rise of a current supplied from the serial circuit 12 composed of the rectifying circuit 10 and the smoothing reactor 11 is delayed by the action of the smoothing reactor 11. Accordingly, a compensation circuit 28 composed of a capacitor 23 and a resistor 24 is provided in parallel with the serial circuit 12. The capacitor 23 is charged up to a no-load voltage produced at the opposite ends of the rectifying circuit 10 at the time when the inverter circuit 7 begins to operate. If the impedance between the electrode 14 and the nozzle 15 declines due to the dielectric breakdown caused by the high-frequency discharge, the capacitor 23 discharges via the resistor 24 and a resistor 25 so as to compensate the serial circuit 12 whose current rise is slow, thereby allowing a pilot arc to be generated positively. In this case, the current value of the pilot arc is determined autonomously in such a manner that the voltage of the pilot arc and a voltage drop in the resistor 25 due to the current of the pilot arc are brought into equilibrium with the voltage of the serial circuit 12 thanks to the current and voltage characteristics of the serial circuit 12. A current detector 26 is adapted to detect a pilot arc current and stop the high-frequency generating circuit 19. When electrical conductance is secured between the electrode 14 and the workpiece 17 by being led by a pilot arc, the capacitor 23 discharges in a main arc circuit constituted by the electrode 14 and the workpiece 17 by means of the resistor 24, and then the current of the serial circuit 12 is supplied, thereby continuing the discharge. If the supply of the current from the serial circuit 12 is confirmed by the current detector 27, the contact 13 is opened, to stop the pilot arc, and a complete main arc discharge follows. The main arc discharge is maintained at a fixed level as a signal corresponding to that current is supplied to the control circuit 8 by the current detector 27 and the switching timing of the transistors 5, 6 is subjected to feedback control.

Figure 2:
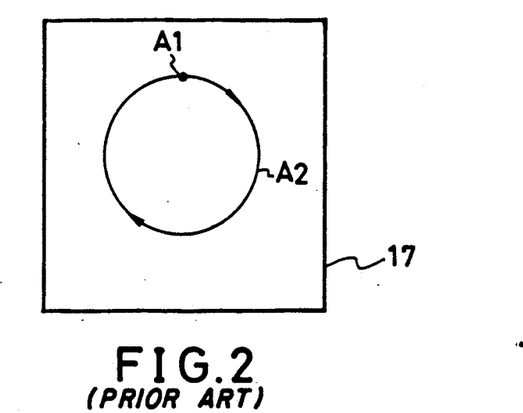
FIG. 2 is a diagram illustrating the boring and cutting of a workpiece by means of a plasma arc.

In addition, conventionally, one plasma torch 18 is provided by using the power source circuit such as the one described above, and, as shown in FIG. 2, such processing as boring (point A1) and cutting (line A2) is performed (piercing start method).

Figures 3A, 3B:
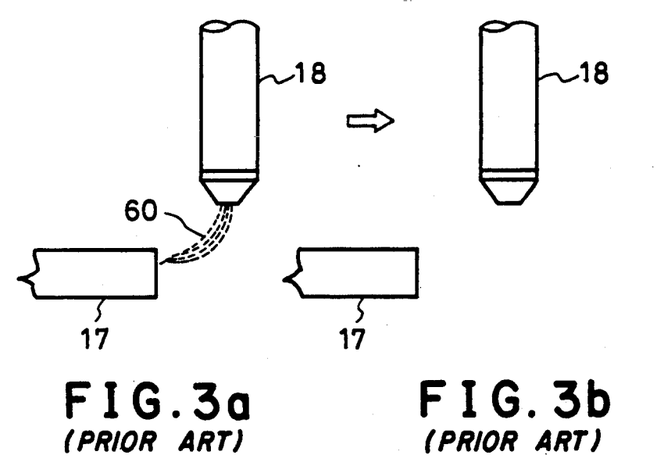
FIGS. 3(a), 3(b), 4(a) and 4(b) are conceptual diagrams at the time of completion of plasma arc cutting in accordance with the conventional art.
Figure 4A:
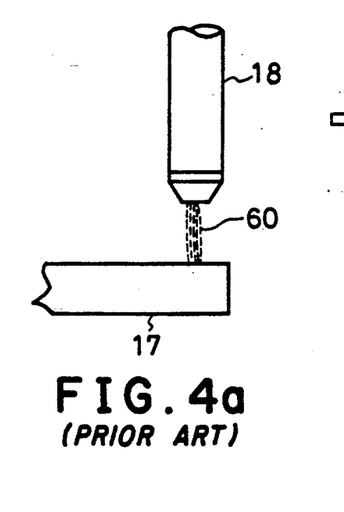
Figure 4B:
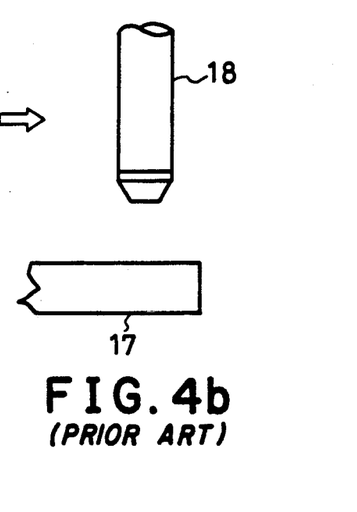
Figure 5:
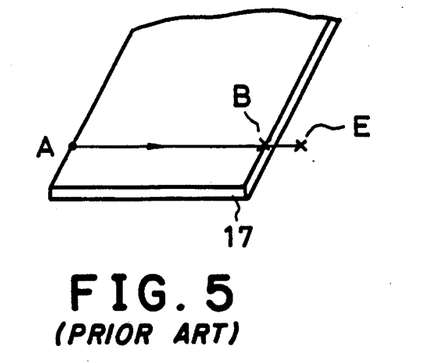
FIGS. 5 and 6 are conceptual diagrams of a conventional arc cutting process.
Figure 6:
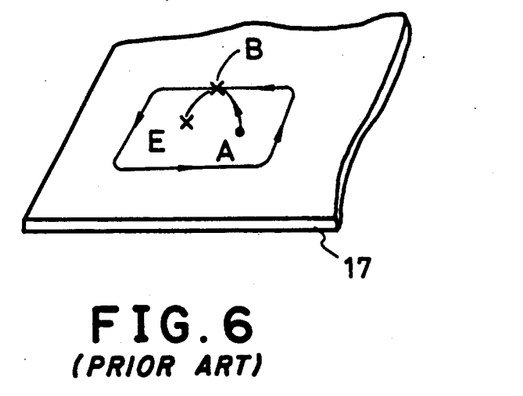
Figure 7A:
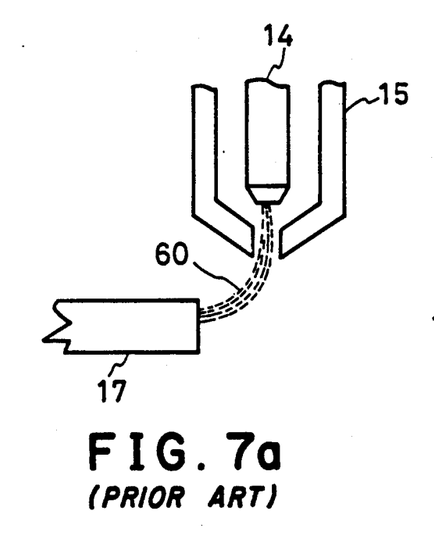
FIGS. 7(a) and 7(b) are conceptual diagrams illustrating the occurrence of a double arc in accordance with the conventional plasma arc cutting process.
Figure 7B:
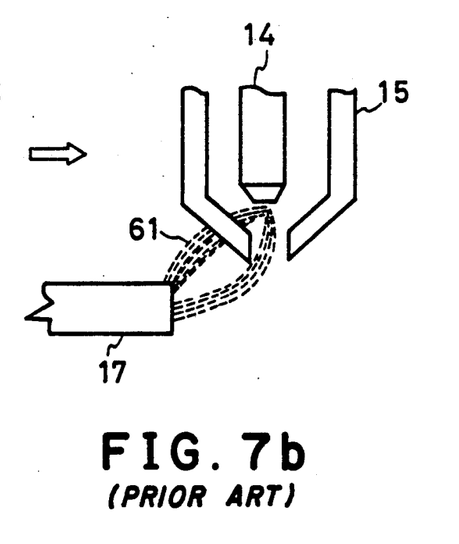

Furthermore, as a method of stopping the arc, following two methods are available: (1) a normal cutting completion method in which the power source is stopped while the plasma torch 18 is located above the workpiece 17 so as to extinguish the main arc, as shown in FIGS. 4(a) and 4(b) forced cutting completion method, as shown in FIG. 3(a), in which the plasma torch 18 is separated completely from the workpiece, making it impossible to maintain the main arc and thus extinguishing the arc. However, in cases where a portion of the workpiece 17 is cut off, as shown in FIG. 5, or the external configuration is used as a product after the inner configuration is cut off, as shown in FIG. 6, if the normal cutting completion method is used, a portion of the workpiece is left and it is difficult to provide timing for the movement of the plasma torch and a stop signal for the power source. Accordingly, the forced cutting completion method, in which point E after passing point B is used as a completion point, is usually employed in such cases. According to this method, as shown in FIG. 7(a), a main arc 60 is drawn in the form of a discharge of a normal configuration, and the possibility of the arc being extinguished is small. In many cases, the arc is extinguished after undergoing the state of a double arc 61 (a part or a substantial portion of the current forms a double current path via the nozzle body without passing through the orifice of the nozzle 15), as shown in FIG. 7(b).

In cutting a workpiece with high precision and high efficiency by using such a plasma arc cutter, the following points are desirable:

(1) The diameter of the orifice is made small so as to restrict the arc, thereby enhancing the current density of the arc.

(2) The amount of dross adhering to the nozzle is kept to a minimum.

(3) The occurrence of a double arc, which results in the deterioration of the nozzle and a decline in cutting quality, is prevented.

With the conventional art, however, the following problems are encountered:

(1) Following a high-frequency discharge, a pilot arc is ignited, but a nozzle-side arc arrival point is located upstream of the orifice, is blown to the downstream side by the current of the working gas, passes through the orifice and moves to the main arc. In this case, if the diameter of the orifice is small, when the pilot arc is ignited, the working gas expands suddenly by the heat caused by the arc. Hence, the flow rate of the gas at the orifice declines, and the action of the gas current moving the arc arrival point declines, thereby delaying a shift from the pilot arc to the main arc. Since the pilot arc causes an arc discharge by using the nozzle as an anode, deterioration of the nozzle is entailed. Therefore, if the shift to the arc discharge is delayed, the deterioration of the nozzle advances, resulting in a decline in the cutting performance. If the starting of such an arc is repeated, the deterioration of the nozzle advances rapidly, and it is difficult to reduce the diameter of the orifice in the nozzle.

(2) In order to prevent the dross from being blown up and being attached to the nozzle, the distance (i.e., stand-off) between the workpiece and the plasma torch may be made larger than at the time of cutting in a steady state. However, if the stand-off is made large, the shift from the pilot arc to the main arc becomes difficult, so there are limitations to making the stand-off large.

(3) The invention of Japanese Patent Laid-Open No. 24864/1987 has been proposed as a method of detecting the limit of using an electrode by paying attention to voltage fluctuations entailed by the deterioration of the electrode. However, prior to the present invention no appropriate means has been found for preventing in advance the occurrence of the double arc itself.

The present invention has been devised in light of the above-described problems, and an object of the present invention is to provide a plasma arc cutter which is capable of cutting workpieces with good precision and high efficiency and a method of controlling the same.

DISCLOSURE OF INVENTION

In accordance with the invention there is provided a plasma arc cutter having an inverter circuit for converting a commercial alternating current into a predetermined high frequency alternating current, a rectifying circuit connected to an output terminal of the inverter circuit, a smoothing reactor connected in series to the rectifying circuit, an electrode of a plasma torch connected to the cathode side of a serial circuit composed of a rectifying circuit and a smoothing reactor via a coupling coil for generation of an arc starting high-frequency voltage, a workpiece connected to the anode side of the serial circuit, and a nozzle of the plasma torch similarly connected to the anode side via a resistor and a contact, the plasma arc cutter characterised in that, with respect to the serial circuit composed of the rectifying circuit and the smoothing reactor, a rise compensating circuit and a shift compensating circuit both composed of a charging and discharging capacitor and a resistor are respectively inserted in parallel between an electrode-side connection and a nozzle-side connection and between the electrode-side connection and a workpiece-side connection, and that a diode is provided on the workpiece-side connection in such a manner as to be inserted between a connecting point of the nozzle-side connection and a connecting point of the shift compensating circuit. In addition, a detector for controlling a current is provided on the electrode-side connection at a position closer to the electrode side than a connecting point of the rise compensating circuit. Furthermore, a detector for detecting a shift is provided on the workpiece-side connection at a position closer to the workpiece side than the connecting point of the shift compensating circuit.

A pilot arc is generated on the basis of a current value set by current control, and after a shift from the pilot arc to a main arc takes place, the set current value is changed over to a current value set by the current control of the main arc.

In addition, at the time of effecting piercing for boring and cutting, at least one plasma torch for boring and at least one plasma torch for cutting are provided.

Furthermore, a voltage between the electrode and the workpiece or between a nozzle and the workpiece is detected, the voltage is caused to rise as the distance between the plasma torch and the workpiece becomes larger, and a power source is stopped when the voltage exceeds a predetermined value.

By virtue of the above-described arrangement, the current of the pilot arc is subjected to current control by the inverter circuit in the same way as the current of the main arc, with the result that the current of the pilot arc is stabilized. Accordingly, it is possible to maintain the pilot arc with a lower current. The amount of heating can consequently be reduced, and the amount of expansion is made small. The flow of the operating gas at the nozzle orifice is made smoother, and the shift from the pilot arc to the main arc is facilitated. Accordingly, the diameter of the nozzle can be reduced, and the stand-off can be increased.

In addition, the possibility of cutting being effected by using a plasma torch damaged by the blowing up of dross the time of boring can be reduced substantially to nil, with the result that cutting precision is increased.

Moreover, if the distance between the plasma torch and the workpiece becomes large after completion of cutting, the main arc is drawn and the voltage rises sharply. When the voltage exceeds a limit, the arc shifts to a double arc, causing the voltage to decline. When that distance becomes far larger, the voltage rises again, but it becomes impossible to maintain the discharge by even the double arc (broken line in FIG. 14 and the arc is thereby extinguished. Accordingly, it is possible to prevent the occurrence of a double arc if the power source is stopped by detecting voltage $P_C$ ($P_C < P_D$) after voltage $P_b$ rises sharply upon completion of cutting and before it reaches limit $P_d$ for generation of a double arc.

BEST MODE FOR CARRYING OUT THE INVENTION

Figure 8:
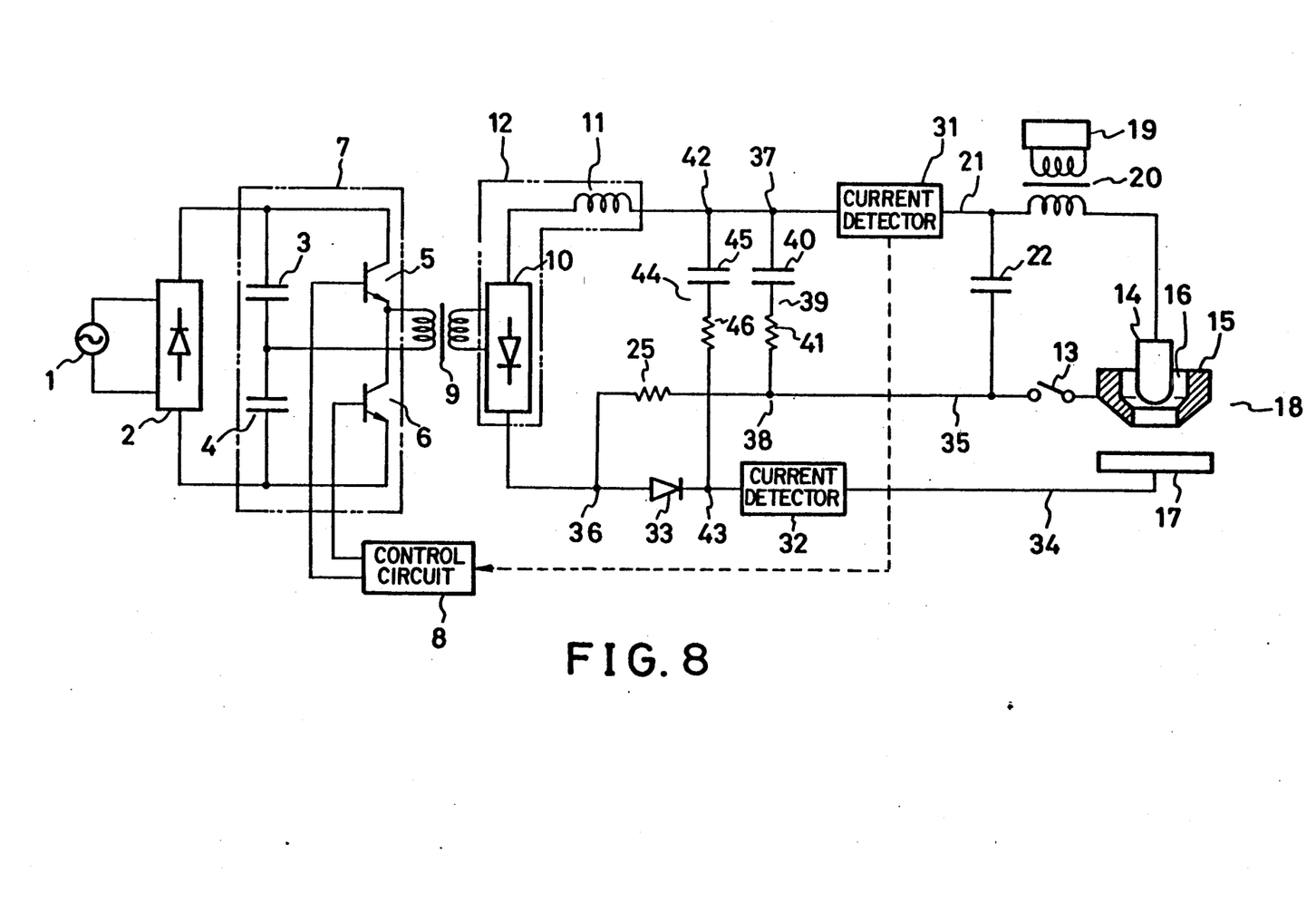
FIG. 8 is a circuit diagram of a power source for a plasma arc cutter in accordance with a first embodiment of the present invention.

FIG. 8 is a circuit diagram of a power source for a plasma arc cutter in accordance with a first embodiment of the present invention. The components that are identical with those of FIG. 1 which illustrates the conventional art are denoted by the same reference numerals, and a description thereof will be omitted.

In FIG. 8, a detector 31 for controlling a current is provided on an electrode-side connection 21 between an electrode 14 and a smoothing reactor 11, and a detector 32 for confirming a shift and a diode 33 are provided on a workpiece-side connection 34 between a workpiece 17 and a rectifying circuit 10. A nozzle-side connection 35 is connected to a nozzle 15 and a connecting point 36 provided between the rectifying circuit 10 on a workpiece-side connection 34 and the diode 33, a contact 13 and a resistor 25 being provided in series on the nozzle-side connection 35 itself. A capacitor 40 for igniting a pilot arc and a resistor 41 are provided in a rise compensating circuit 39 disposed between a connecting point 37 between the detector 31 on the electrode-side connection 21 and the smoothing reactor 11 on the one hand, and a connecting point 38 on the nozzle-side connection 35 on the other. In addition, a capacitor 45 for shifting from a pilot arc to a main arc and a resistor 46 are provided in a shift compensating circuit 44 disposed between a connecting point 42 between the detector 31 on the electrode-side connection 21 and the smoothing reactor 11 on the one hand, and a connecting point 43 between the diode 33 on the workpiece-side connection 34 and the detector 32 on the other.

The operation will be described below on the basis of the above-described arrangement. At the time of starting, a pilot arc is generated after dielectric breakdown takes place due to a high-frequency discharge. However, since the rise in a current takes place by means of the exclusively provided rise compensating circuit 39, the rise can be effected smoothly without an delay. At this juncture, a discharge current from the pilot arc igniting capacitor 40 is detected by the detector 31 and controlled by a control circuit 8 in such a manner that a control current will rise as the discharge current attenuates. Accordingly, its current value is maintained at a substantially constant value without excessively exceeding a preset value. Subsequently, during a shift from a pilot arc to a main arc, the discharge current from the shifting capacitor 45 is also detected by the detector 31 and controlled by the control circuit 8 in such a manner that a control current will rise as the discharge current attenuates. As a result, its current value is also maintained at a substantially constant value. In addition, since the two systems of the rise compensating circuit 39 and the shift compensating circuit 44 are provided separately, and the reverse-blocking diode 33 is disposed on the workpiece-side connection 34, the voltage between the electrode 14 and the workpiece 17 does not fall below no-load voltage, thereby facilitating a shift from the pilot arc to the main arc. The shift can be effected smoothly even if the diameter of the orifice in the nozzle 15 is small and the stand-off is high. Furthermore, if the shift from the pilot arc to the main arc is confirmed by the detector 32, the control circuit 8 is changed over to a mode for controlling the current of the main arc, and the discharge current of the main arc is detected by the detector 31 and is fed back to the control circuit 8.

Figure 9:
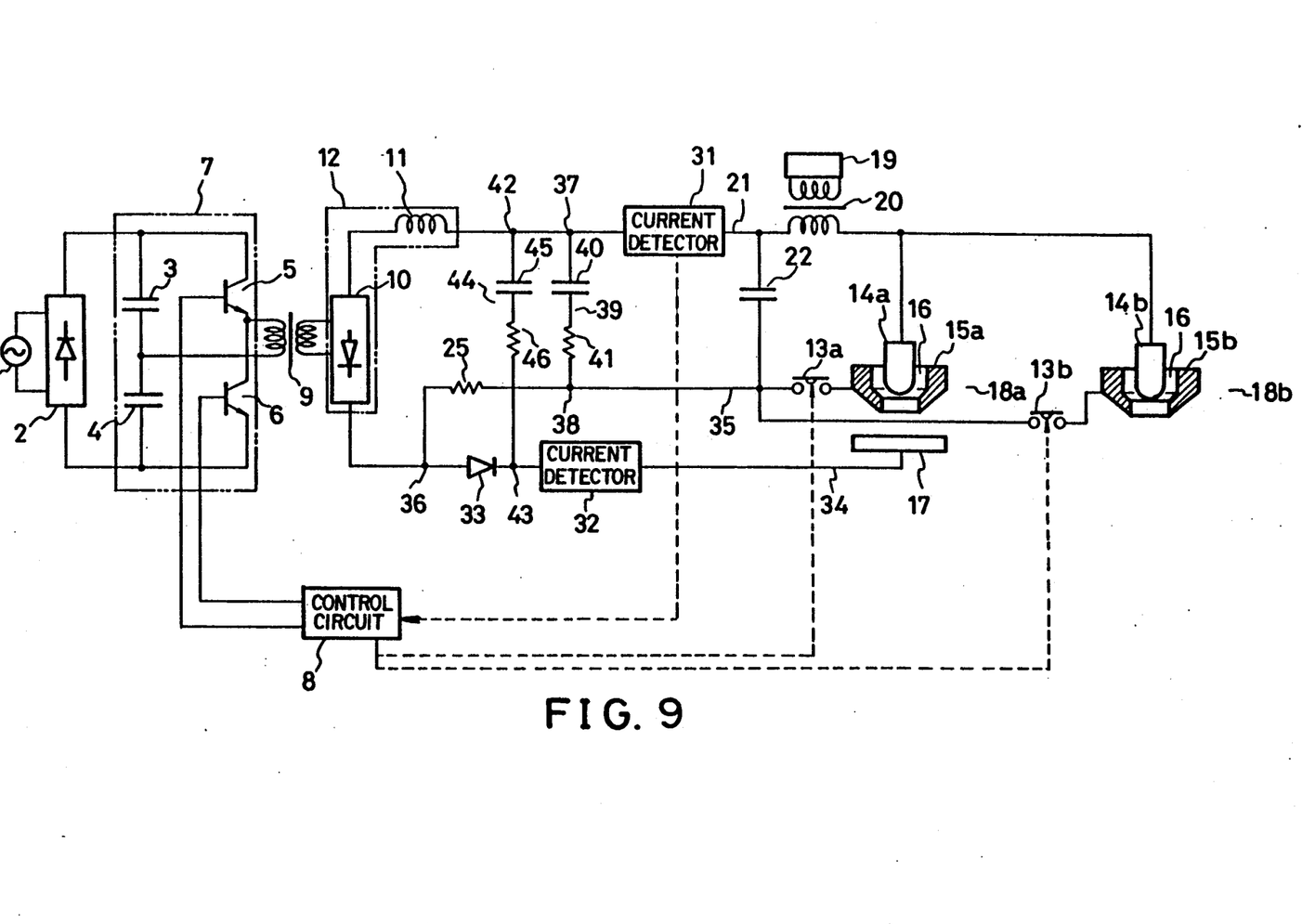
FIG. 9 is a circuit diagram of a power source for a plasma arc cutter in accordance with a second embodiment of the present invention.
Figure 10:
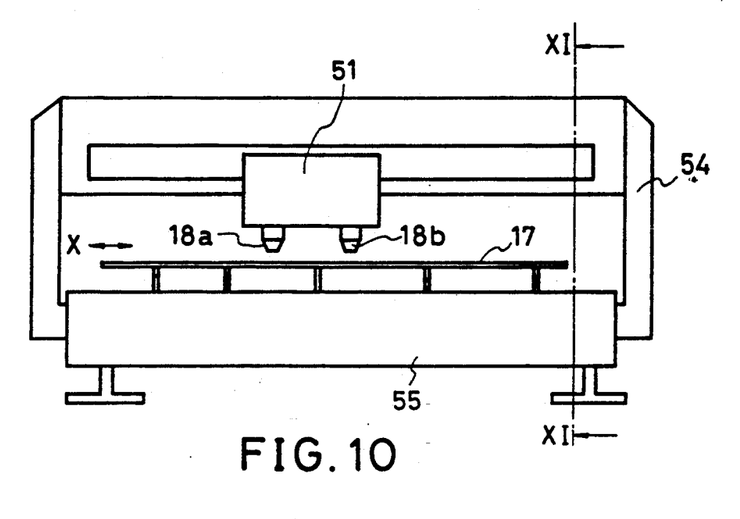
FIG. 10 is a front elevational view of the plasma arc cutter in accordance with the second embodiment of the present invention.
Figure 11:
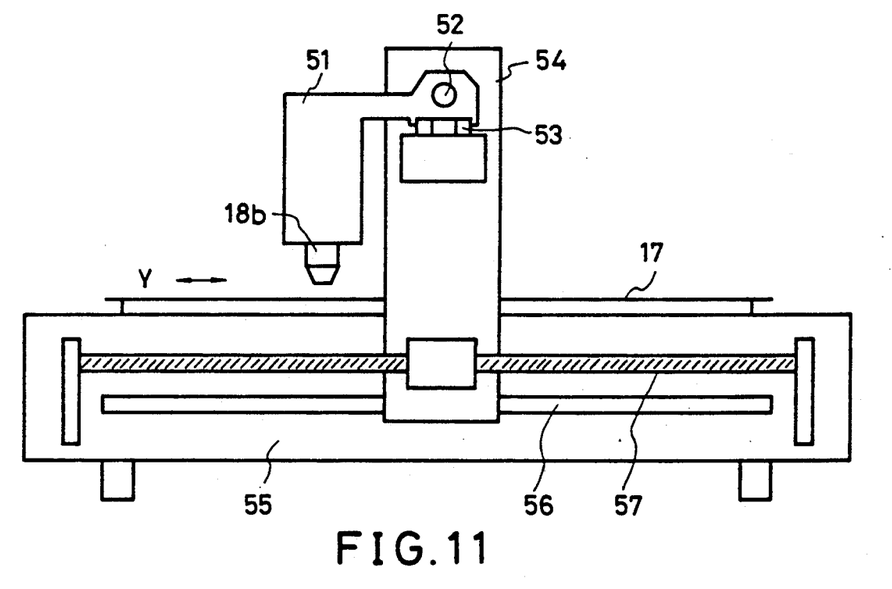
FIG. 11 is a cross-sectional view taken along the line IX—IX of FIG. 10.

FIG. 11 is a circuit diagram of a power source for a plasma arc cutter in accordance with a second embodiment of the present invention, a front elevational view of the cutter, and a cross-sectional view thereof, respectively. In FIG. 9, a plasma torch 18a used exclusively for boring and a plasma torch 18b used exclusively for cutting are provided, electrodes 14a, 14b of the plasma torches 18a, 18b being connected to the electrode-side connection 21. Nozzles 15a, 15b are connected to the nozzle-side connection 35 via contacts 13a, 13b, respectively. The contacts 13a, 13b are opened and closed in response to signals from the control circuit 8.

In FIGS. 10 and 11, the plasma torches 18a, 18b are juxtaposed on a torch mounting carriage 51 and are adapted to slide in the X-direction along rails 53 by means of a ball screw for torches. The rails 53 are secured to a moving frame 54 which is adapted to slide in the Y-direction by means of a moving ball screw 57 along a guide 56 fixed on a table 55.

The operation will be described hereafter on the basis of the above-described arrangement. At the time of processing the workpiece 17, the control circuit 8 first supplies a signal to the contact 13a for the plasma torch 18a used exclusively for boring so as to close the same. Then, in the same way as the first embodiment, a shift takes place from the pilot arc to the main arc, and boring is performed. At the time of completion of boring, a change in the discharge current is detected by the detector 31, and the control circuit 8 supplies a signal to the contact 13a to open the same, thereby stopping energization of the plasma torch 18a used exclusively for boring. The torch mounting carriage 51 and the moving frame 54 are moved by predetermined amounts, and the plasma torch 18b used exclusively for cutting is moved to the boring completed position. After a predetermined period of movement has elapsed, the control circuit 8 supplies a signal to the contact 13b for the plasma torch 18b used exclusively for cutting so as to close the same. Then, in the same way as the first embodiment, a shift takes place from the pilot arc to the main arc, and cutting is performed. By virtue of movement in the X- and Y-directions, the workpiece 17 placed on the table 55 and connected to the workpiece-side connection 34 can be processed with good precision and high efficiency in an integrated process covering boring and cutting.

It should be noted that although the plasma torch is moved in the X- and Y-directions by means of the ball screws, a motor and an encoder may be used alternatively. Although boring is detected by the current detector, it may be detected by placing an optical sensor, a temperature sensor, etc., below the workpiece. In addition, although the contact is provided on only the nozzle-side connection, it goes without saying that the contact may also be provided on the electrode-side connection. Furthermore, although the circuit of the first embodiment of the present invention is used as a power source circuit, a conventional power source circuit may be used.

Figure 12:
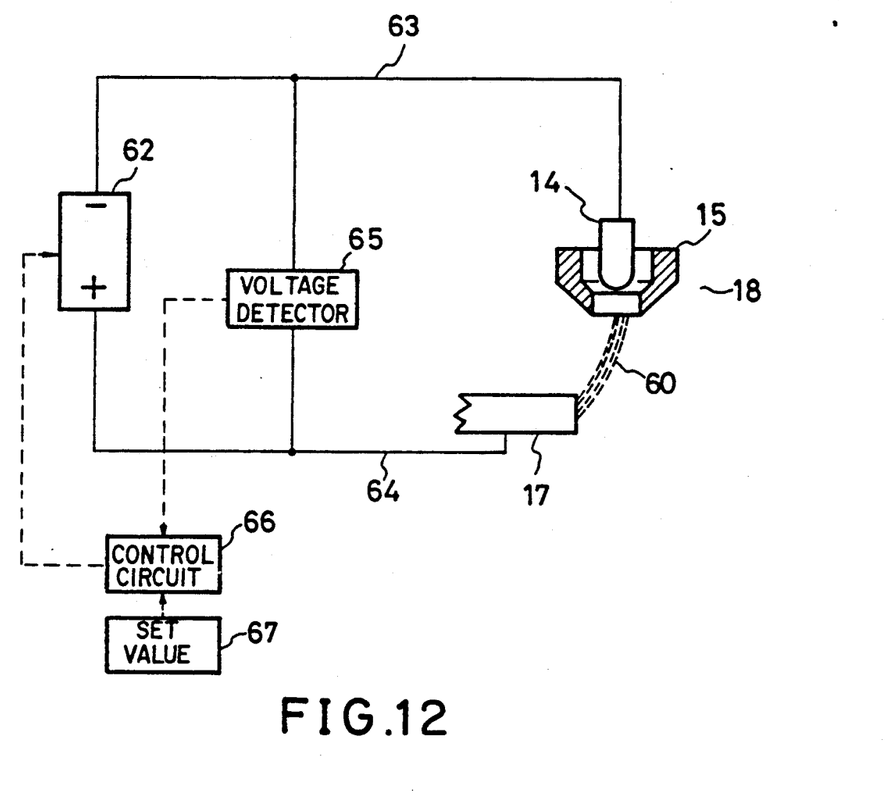
FIG. 12 is a circuit diagram of a power source for a plasma arc cutter in accordance with a third embodiment of the present invention.
Figure 13:
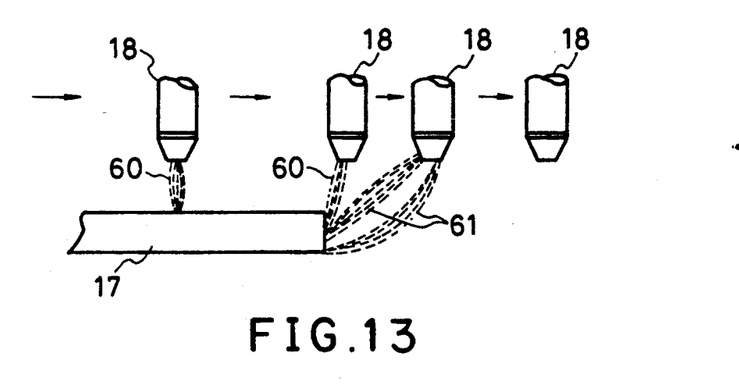
FIG. 13 is a conceptual diagram illustrating the position of a plasma torch and the occurrence of a double arc.
Figure 14:
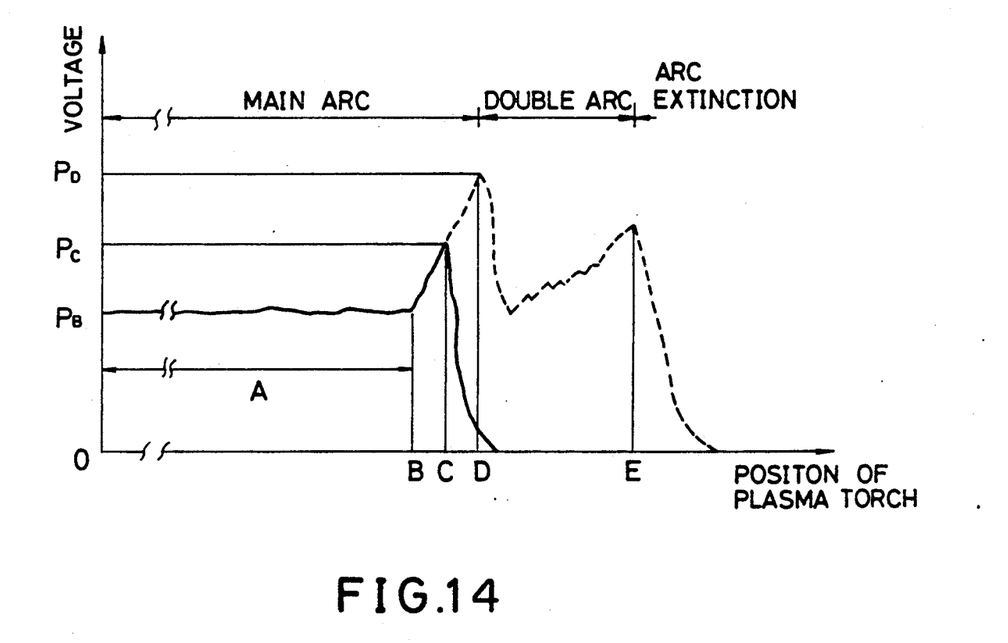
FIG. 14 is a graph illustrating voltage fluctuations in accordance with the third embodiment of the present invention and the conventional art.

FIGS. 12, 13 and 14 are a circuit diagram of a power source for a plasma arc cutter in accordance with a third embodiment of the present invention, a conceptual diagram illustrating the generation of a double arc thereof, and a graph illustrating voltage fluctuations thereof. In FIG. 12, a gas such as oxygen, nitrogen, argon, or the like flows through the space between the nozzle 15 and the electrode 14 of the plasma torch 18, and this gas is heated by the arc discharge and blows out in the form of high-temperature, high-velocity arc plasma 60. A DC power source 62 is connected to the electrode 14 at its negative electrode and to the workpiece at its positive electrode via connections 63, 64, respectively. A voltage detector 65 for detecting the voltage between the electrode 14 and the workpiece 17 is interposed between the connections 63, 64. In addition, a control circuit 66 is provided which is adapted to compare a signal from a set voltage signal source 67 provided separately from a signal from the voltage detector, and which is also adapted to stop application of the voltage by supplying a stop signal to the DC power source 62 when the voltage between the electrode 14 and the workpiece 17 exceeds a set voltage.

The operation will be described below on the basis of the above-described arrangement. In FIGS. 13 and 14, when the plasma torch 18 passes through cutting area A and completion position B and further rightward as viewed in the drawings, the voltage rises as the distance between the workpiece 17 and the electrode 14 becomes large. When this voltage reaches a set voltage $P_C$ which is lower than the double arc generation voltage $P_D$, the control circuit 66 is actuated by a signal from the voltage detector 65, and thereby stops the DC power source 62 (position C). As a result, the voltage being applied to the workpiece 17 and the electrode 14 (solid line in FIG. 11b) is stopped, thereby presenting the increase in the voltage (dashed line in FIG. 11b) to $P_D$ and the resulting occurrence of a double arc 61. Next the best mode of the third embodiment will be described below. If oxygen is used as an operating gas and a plasma torch with the diameter of the nozzle orifice set to 0.5 mm is used, it is possible to cut a 1.6 mm-thick soft steel plate at the speed of 1 m/min or thereabouts with a current of 12 amperes and under an oxygen gas pressure of 5.5 kgf/cm$_2$ The voltage $P_B$ between the electrode and the workpiece during normal cutting was approximately 110 V, and the double arc generation voltage $P_D$ was approximately 180 V. Accordingly, it was considered that the set voltage $P_C$ at which a stop signal was supplied to the DC power source might be set in the range of 110 V to 180 V. However, since the double arc generation voltage $P_D$ is not necessarily constant, if the set voltage $P_C$ is too close to 180 V, a double arc can possibly occur until the set value is reached. To the contrary, if the set value is too low, a stop signal will be issued to the DC power source to stop the cutting operation. As a result, if the set voltage $P_C$ is set in the range of 140 V to 170 V, optimum results can be obtained. In the third embodiment of the present invention, detection of the voltage is performed between the electrode and the workpiece, but detection may be effected between the nozzle and the workpiece. In addition, it goes without saying that the set voltage source can be made variable so that a set value can be set arbitrarily.

Industrial Applicability

As described above, in the plasma arc cutter and the method of controlling the same in accordance with the present invention, a shift from the pilot arc to the main arc is facilitated, and the diameter of the nozzle orifice can be made small. Accordingly, the current density can be enhanced, and the stand-off can be set to a high level. In addition, the possibility of cutting being effected by using a plasma torch damaged during boring is reduced substantially to nil, and the occurrence of a double arc during cutting is prevented, the plasma arc cutter and the method of controlling the same in accordance with the present invention are suitable to cutting a workpiece with high precision and high efficiency.

What is claimed is:

1. A plasma arc cutter having an inverter circuit for converting a commercial alternating current into a predetermined high frequency alternating current, a rectifying circuit connected to an output of said inverter circuit, a smoothing reactor connected in series to said rectifying circuit, an electrode of a plasma torch connected to the cathode side of a serial circuit composed of said rectifying circuit and said smoothing reactor via a coupling coil for generation of an arc starting high-frequency voltage, a workpiece connected to the anode side of said serial circuit, and a nozzle of said plasma torch similarly connected to said anode side via a first resistor and a first switch, said plasma arc cutter being characterised in that, with respect to said serial circuit composed of said rectifying circuit and said smoothing reactor, a rise compensating circuit composed of a charging and discharging capacitor and a resistor is inserted between an electrode-side connection and a nozzle-side connection and a shift compensating circuit composed of a charging and discharging capacitor and a resistor is inserted between said electrode side connection and a workpiece-side connection, that a diode is provided on said workpiece-side connection in such a manner as to be inserted between a connection point of said nozzle-side connection and a connecting point of said shift compensating circuit, that a detector for controlling a current is provided on said electrode-side connection at a position closer to the electrode side than a connecting point of said rise compensating circuit, and that a detector for detecting a shift is provided on said workpiece-side connection at a position closer to the workpiece side than said connecting point of said shift compensating circuit.

2. A method of controlling a plasma arc cutter according to claim 1, characterised in that a pilot arc is generated on the basis of a current value set by current control, and after a shift from said pilot arc to a main arc takes place, said set current value is changed over to a current value set by the current control of said main arc.

3. A plasma arc cutter in accordance with claim 1 wherein said rectifying circuit is connected to an output of said inverter circuit via a transformer.

4. A plasma arc cutter in accordance with claim 1 further comprising a high frequency generating circuit for applying a high frequency high voltage across said coupling coil; a bypass capacitor; said coupling coil, said bypass capacitor and said switch being connected in series between said electrode and said nozzle such that said high frequency high voltage across said coupling coil and the voltage supplied by said serial circuit are superimposed and applied between said electrode and said nozzle.

5. A plasma cutter in accordance with claim 1 further comprising a control circuit for varying the output of said inverter circuit responsive to the detection, by said detector for controlling a current, of discharge current from the capacitor of said rise compensating circuit, to thereby increase the current output of said inverter circuit as said discharge current attenuates such that the current to the pilot arc is maintained at a substantially constant value without excessively exceeding a preset value.

6. A plasma arc cutter in accordance with claim 5 wherein said control circuit varies the output of said inverter circuit responsive to the detection, by said detector for controlling a current, of discharge current from the capacitor of said shift compensating circuit during a shift from a pilot arc to a main arc, to thereby increase the current output of said inverter circuit as the discharge current of the shift compensating circuit attenuates such that the current to the main arc is maintained at a substantially constant value.

7. A plasma arc cutter in accordance with claim 6 wherein said plasma torch is for boring a hole in the workpiece, and further comprising a second plasma torch for cutting the workpiece, with the electrode of the cutting plasma torch being connected to the electrode of the boring plasma torch, the nozzle of said cutting plasma torch being connected to said anode side of said serial circuit by a resistor and a second switch, and wherein said control circuit selectively opens and closes said first and second switches.

8. A plasma arc cutter in accordance with claim 7 further comprising means for detecting the voltage between the workpiece and one of the electrode and the nozzle of the cutting plasma torch and for stopping the application of electrical power to said cutting plasma torch when the thus detected voltage exceeds a predetermined value.

9. A plasma arc cutter having a power source for supplying a direct current output capable of stably maintaining an arc discharge from a plasma torch to a workpiece, said plasma arc cutter being characterized in that at least one plasma torch for boring a hole in the workpiece and at least one plasma torch for cutting the workpiece are provided to effect boring and cutting, said at least one plasma torch for cutting being separate and distinct from said at least one plasma torch for boring.

10. A plasma arc cutter in accordance with claim 3, wherein each of the plasma torches comprises an electrode and a nozzle whereby gas can flow through the space between the electrode and the nozzle and through the nozzle toward the workpiece.

11. A plasma arc cutter in accordance with claim 10 further comprising first means for selectively applying electrical power from said power source to said at least one plasma torch for boring for forming a plasma arc between the respective plasma torch and the workpiece to bore at least one hole in the workpiece and then discontinuing the application of electrical power to said at least one plasma torch for boring; means for providing relative movement between the workpiece and the plasma torches; and second means for selectively applying electrical power from said power source to said at least one plasma torch for cutting, for forming a plasma arc between the respective plasma torch and the workpiece, to effect cutting of the workpiece.

12. A plasma arc cutter in accordance with claim 11 further comprising means for detecting the completion of the boring operation and to actuate said first means, to cause the discontinuation of the application of electrical power to said at least one plasma torch for boring, upon the detection of the completion of the boring operation.

13. A plasma arc in accordance with claim 11 further comprising a current detector for measuring the current, from the power source to said at least one plasma torch for boring, to detect the change in said current which occurs at the completion of the boring operation and to actuate said first means, to cause the discontinuation of the application of electrical power to said at least one plasma torch for boring, upon the detection of the change in said current which occurs at the completion of the boring operation.

14. A plasma arc in accordance with claim 13 wherein the means for providing relative movement results in each plasma torch for cutting being at a boring completed position.

15. A plasma arc cutter in accordance with claim 14 wherein said second means is actuated, to apply electrical power from said power source to said at least one plasma torch for cutting, after a predetermined period of relative movement between the plasma torches and the workpiece has elapsed.

16. A plasma arc cutter in accordance with claim 15 further comprising means for detecting a voltage between the workpiece and at least one plasma torch for cutting, wherein the thus detected voltage increases as the distance between the workpiece and the plasma torch increases; and means for actuating said second means, to cause the discontinuation of electrical power to said at least one plasma torch for cutting, when the thus detected voltage exceeds a predetermined value which is greater than the value of the thus detected voltage during normal cutting and less than the value of the thus detected voltage at which double arc generation would occur.

17. A plasma arc cutter in accordance with claim 16, wherein said power source comprises at least an inverter circuit for converting a commercial alternating current into a predetermined high frequency alternating current, a rectifying circuit connected to an output terminal of said inverter circuit, and a smoothing reactor connected in series to said rectifying circuit.

* * * * *

UNITED STATES PATENT AND TRADEMARK OFFICE
CERTIFICATE OF CORRECTION

PATENT NO. : 5,036,176

DATED : July 30, 1991

INVENTOR(S) : Yoshihiro Yamaguchi and Iwao Kurokawa

It is certified that error appears in the above-identified patent and that said Letters Patent is hereby corrected as shown below:

On the cover page, under "Inventors:", delete "Iwao Kuorkawa" and insert --Iwao Kurokawa--.
Column 2, line 27, after "4(b)" insert --, and (2) a--.
Column 4, line 38, delete "14" and insert --14)--;
         line 42, delete "Pb" and insert --$P_B$--;
         line 43, delete "Pd" and insert --$P_D$--;
         line 56, after "tional" insert --plasma--.
Column 5, line 51, delete "an" and insert --any--.
Column 6, line 12, delete "FIG. 11 is" and insert --FIGS. 9 to 11 are--.
Column 7, line 38, delete "presenting" and insert --preventing--;
         line 40, after "Next" insert --,--.
Column 8, line 37, delete "electrode side" and insert --electrode-side--;
         line 40, delete "connection" and insert --connecting--.

Signed and Sealed this

Twenty-third Day of March, 1993

Attest:

STEPHEN G. KUNIN

*Attesting Officer*      *Acting Commissioner of Patents and Trademarks*